(12) United States Patent
Tuszynski

(10) Patent No.: US 7,001,127 B2
(45) Date of Patent: Feb. 21, 2006

(54) NON-PYROLYTICALLY ACTUATED REDUCED-SHOCK SEPARATION FASTENER

(75) Inventor: Andrew Tuszynski, Torrance, CA (US)

(73) Assignee: Hi-Shear Technology, Torrance, CA (US)

( * ) Notice: Subject to any disclaimer, the term of this patent is extended or adjusted under 35 U.S.C. 154(b) by 0 days.

(21) Appl. No.: 10/689,815

(22) Filed: Oct. 20, 2003

(65) Prior Publication Data

US 2005/0084364 A1 Apr. 21, 2005

(51) Int. Cl.
*F16B 37/08* (2006.01)
(52) U.S. Cl. .................................... 411/433
(58) Field of Classification Search ........ 411/432–434, 411/267, 270, 348
See application file for complete search history.

(56) References Cited

U.S. PATENT DOCUMENTS

| | | | | |
|---|---|---|---|---|
| 3,334,536 A | * | 8/1967 | Armstrong | 411/434 |
| 3,405,593 A | * | 10/1968 | Kriesel | 411/20 |
| 5,221,171 A | * | 6/1993 | Rudoy et al. | 411/433 |
| 5,248,233 A | * | 9/1993 | Webster | 411/433 |
| 6,352,397 B1 | * | 3/2002 | O'Quinn et al. | 411/434 |

* cited by examiner

*Primary Examiner*—Flemming Saether
(74) *Attorney, Agent, or Firm*—Donald D. Mon

(57) ABSTRACT

A separable fastener for holding two objects together with the use of a bolt threaded into the fastener. The necessary inherent axial tension in the bolt/fastener system is accommodated by a relief element which relieves at least some of the stored tension before the nut separates, thereby reducing the physical shock on the assembly. The energy needed to separate the nut and bolt is entirely contained within the system so that pyrotechnic devices are unnecessary for the purpose.

7 Claims, 4 Drawing Sheets

NON-PYROLYTICALLY ACTUATED REDUCED-SHOCK SEPARATION FASTENER

FIELD OF THE INVENTION

A separable threaded fastener for releasing one object from another in a structure, utilizing an actuator which is other than pyrolytic so as to reduce mechanical shock otherwise caused by abruptly expansive gases, and by the abrupt release of axial tensile force in the assembled structure. In addition, the fastener can be reset for a subsequent use without requiring new components.

BACKGROUND OF THE INVENTION

Especially, although far from exclusively, in the aerospace field objects are held together as part of a structure by means of separable fasteners. Their purpose is to separate the objects from one another on command, meanwhile holding them reliably in the presence of high G loads and strong vibration forces. Such fasteners must themselves be very strong and reliable, and must be able to withstand the same forces as the objects they hold.

Classically such fasteners comprise an internally threaded nut held by one of the objects and an externally threaded headed bolt held to the other object, which is threaded into the nut. When the bolt is tightened into the nut, a strong axial tensil preload force is generated in the assembly, which is stored as energy that will be released when the fastener is separated.

The nut is provided in the form of a plurality of separate segments, each bearing a fragment of the same thread. Separation of the fastener is caused by releasing the segments from the bolt thread. This must be done quickly. It customarily results in an abrupt release of the preload energy and is therefore objectionable, although necessary. Prior efforts to reduce the peak load of this shock have been made, especially by O'Quinn et al in U.S. Pat. No. 6,352,397, which is incorporated herein by reference for its showing of a related device for reducing the peak load, and to illustrate the disadvantages of pyrolytic separation.

In addition to the mechanical shock caused by abrupt release of the axial preload in the installed fastener, a pyrolytic actuator inherently produces a strong mechanical shock because of its abrupt generation of force. Such an abrupt reaction is necessary when very rapid separation is required. Then the need to accommodate for such forces is an accepted disadvantage. Such accommodation can have its price in weight and structure.

However, there are many applications in which a slower, but still acceptably rapid, release can be powered with lesser penalty. In such situations, a non-pyrolytic actuator merits consideration. This is because as space systems continue to seek lighter structures, reduction of abrupt forces is a great advantage, and actuation such as proposed by this instant invention can lead to simpler, lighter weight structural assemblies.

It is an object of this invention to provide a separable fastener which can utilize an actuator that is not pyrolytic, and which also lowers the peak force exerted by release of the axial preload energy. It has the advantage that all of the energy needed to separate the nut from the bolt is carried by the fastener in a mechanical array. The separation of this occurs at a controllably slower pace than would be caused by an abrupt pyrotechnical reaction.

BRIEF DESCRIPTION OF THE INVENTION

A fastener according to this invention includes an internally threaded nut that is to receive a threaded bolt. The bolt is retained by one of the objects to be joined. The nut is mounted to the other object to be joined by a housing which itself is attached to said other object. The nut comprises a plurality of separate segments assembled around the bolt to form an interrupted thread. The segments are held in an assembled configuration by a locking ring which is reciprocably mounted in the housing. The above are features of prior art separable fasteners such as the O'Quinn patent.

According to this invention a relief element is placed between the segments and the structure associated with the "other" object. In this structure, it is the said housing. Axially drawing down the segments by tightening the bolt will press them against the relief element, enabling the nut to resist rotation and to permitting an axial tensile preload to be established in the bolt.

According to this invention, the relief element includes a stator and a rotor. The stator is restrained in the housing against rotation. The rotor is rotatable. The stator and rotor are co-axial.

A ramp surface is formed on the stator and on the rotor. They are complementary, and extend arcuately around the axis. Each has a ramp angle such that they form ramp surfaces which substantially abut one another, at a ramp angle.

The ramp angle is steeper than a locking angle, so that an axial compressive force will exert a rotational force on the rotor, the stator being keyed to the housing to prevent its rotation. Rotation of the rotor (when it is free to rotate) will result in a reduction of the axial thickness of the relief element, and will thereby relieve the axial tensile preload.

All of the force required to release the segments is stored in the fastener at the time it is installed. No further source of energy is required for this purpose. Release of the segments is the principal reason for the use of pyrotechnics in the prior art, made unnecessary with this invention.

A release system for this actuator comprises a control ring which controls the radial extension of a group of bearings. In one position the bearings lock the rotor and stator together against rotation, and in another they enable the rotation of the rotor. Rotation of this control ring requires only minimal force that can be provided by one or more small mechanical actuators-linear (solenoid) or rotary electrical motors, for example.

Thus, with this invention, peak release loads are greatly reduced, and pyrolytic loads are eliminated entirely. Instead, a gradual force exerted laterally and rotationally balanced is used instead for unlocking the rotor and stator from one another, and energy stored in springs separate the threaded segments from the bolt to release the bolt.

The above and other features of this invention will be fully understood from the following detailed description and the accompanying drawings, in which:

DETAILED DESCRIPTION OF THE INVENTION

Figure 1:
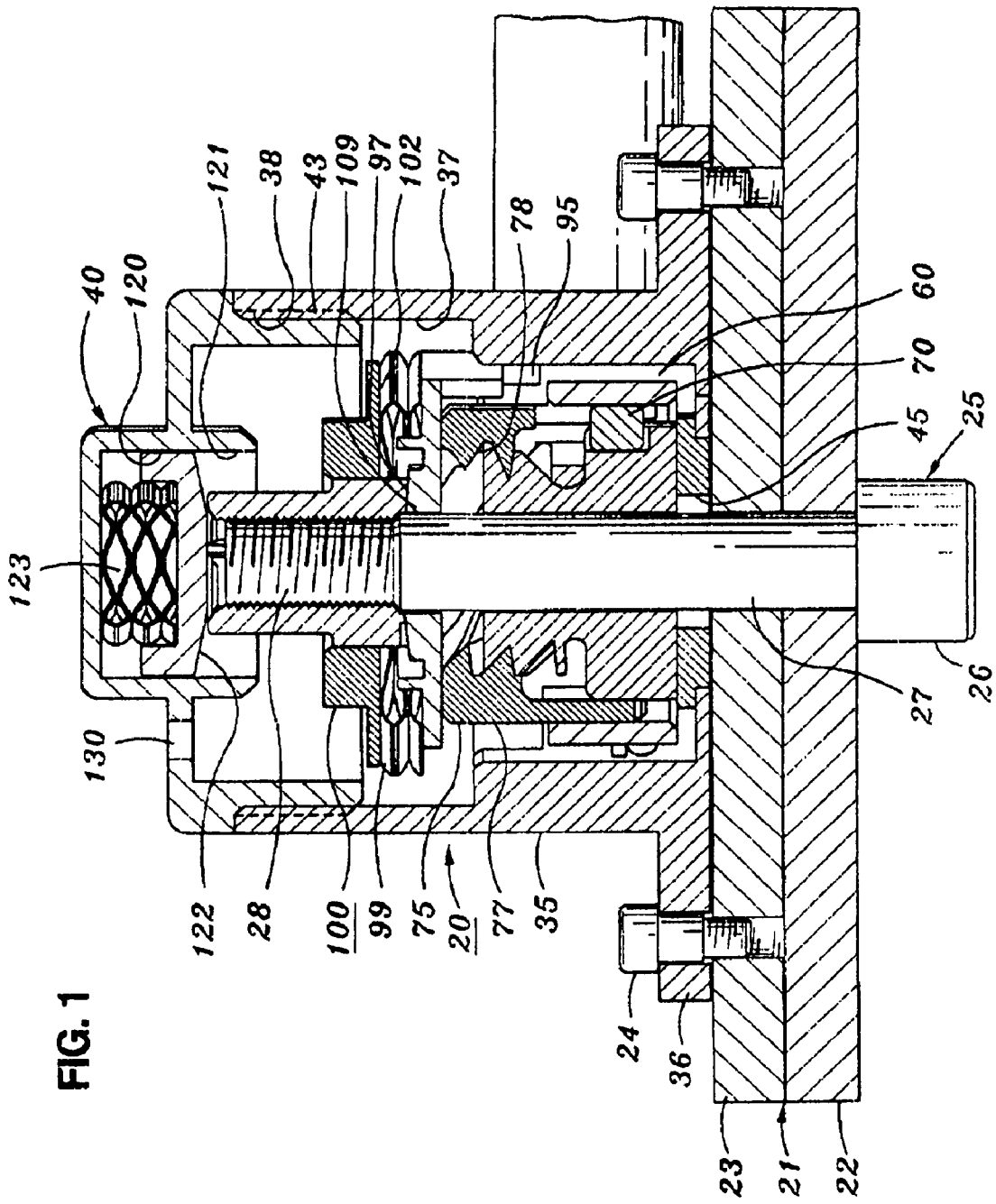
FIG. 1 is an axial section, showing the fastener holding objects together.
Figure 2:
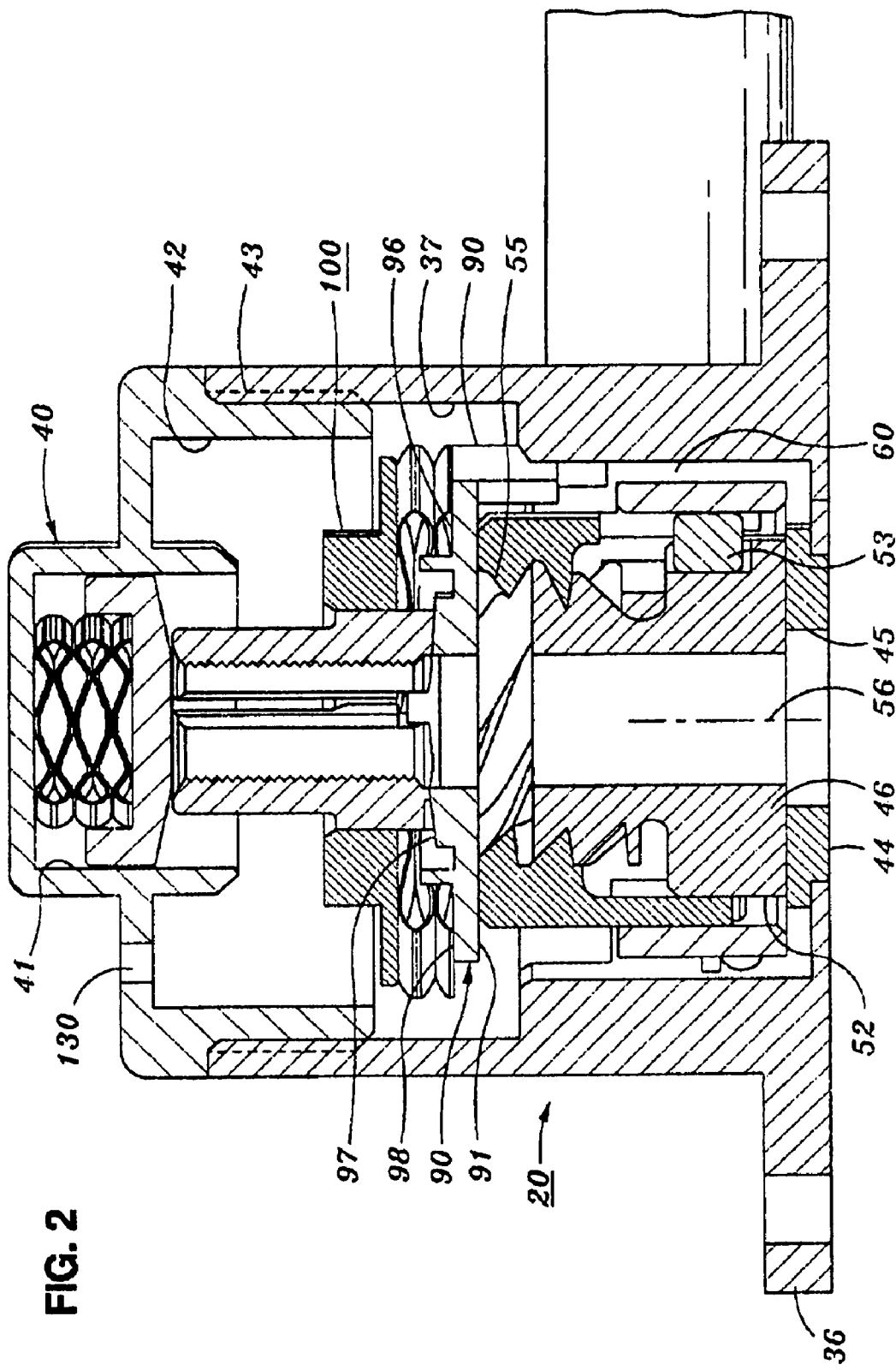
FIG. 2 is a view similar to FIG. 1 taken at line 2—2 in FIG. 3.
Figure 3:
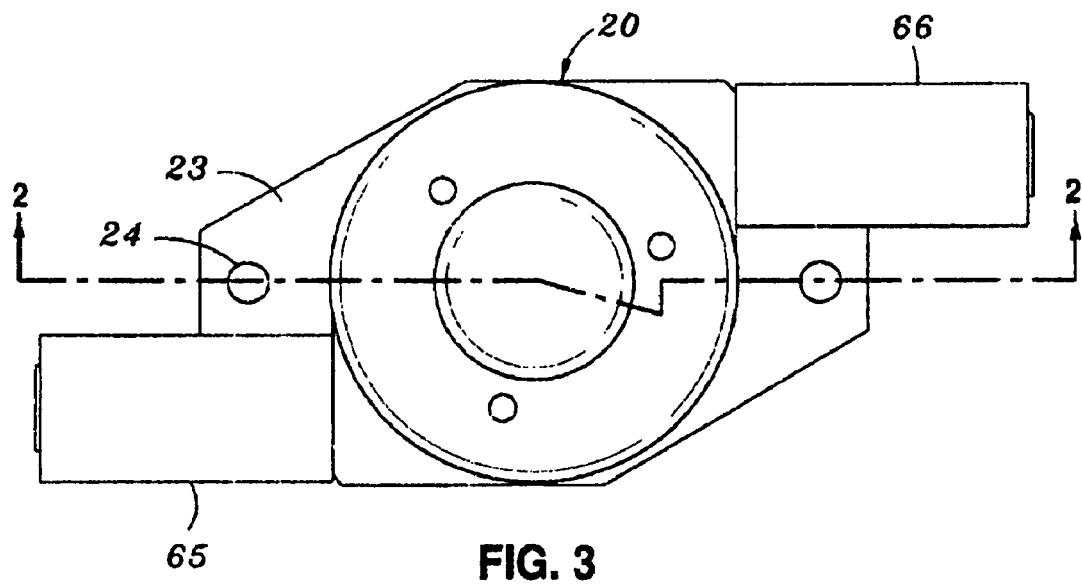
FIG. 3 is a top view of FIG. 1.
Figure 5:
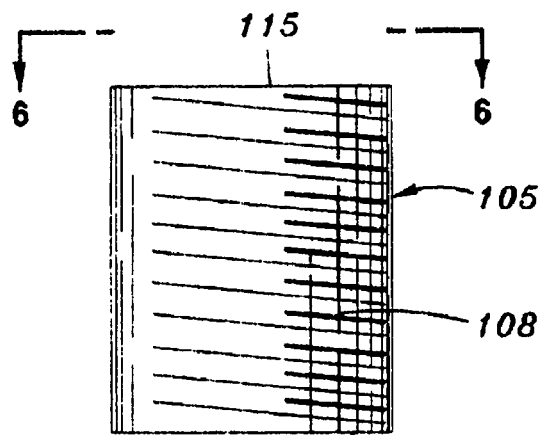
FIG. 5 is a side view of a fastener segment.
Figure 6:
FIG. 6 is a top view taken at line 6—6 in FIG. 5.
Figure 4:
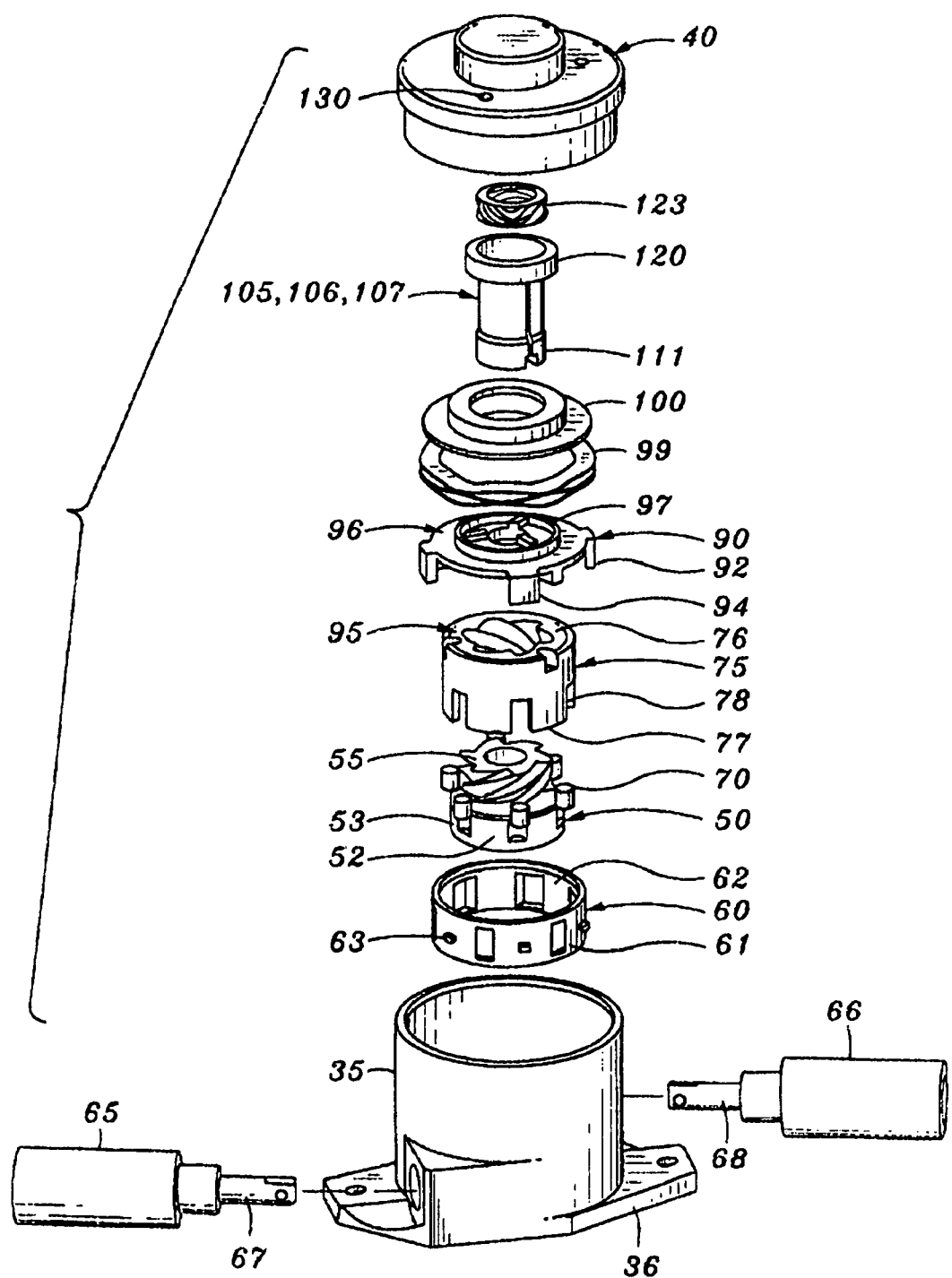
FIG. 4 is an exploded view of the fastener.

The utility of a fastener 20 according to this invention is shown in FIG. 1. It forms part of a structural assembly 21. As an example, one object 22, exemplified as a plate to which any desired element can be mounted is held to another object 23, again shown as a plate. These objects are to be held together by fastener 20 until the moment of separation.

The fastener is fixed to plate 23 by bolts 24 or by other fastener devices. A bolt 25 with a head 26, a shank 27 and a thread 28 on the shank is threaded into fastener 20. Tightening the bolt into a nut to be described holds the objects together. When they are joined, the torque on the bolt exerts through the threads an axial tensile preload force that tightly holds the objects together. The release of the energy stored in the bolt will, unless regulated, exert a strong impact force on the entire structure.

Fastener 20 includes a body 35 with a mounting flange 36 and a rising tubular housing 37. The housing has an internal thread 38 at its upper end. A housing hat 40 includes an upper internal cylinder 41 and a depending skirt 42 with thread 43 engagable with thread 38 to hold the fastener assembled in condition for installation in a structure, ready to receive a threaded bolt. An access port 130 is formed through it for a purpose to be described.

Base 35 includes an insert 44 with a central opening 45 to pass a bolt, and a very smooth flat reaction surface 46 (perhaps on an insert 47). A rotor 50 has a bottom flat reaction surface 51 which is intended to move in shear motion along reaction surface 46.

The rotor further includes a peripheral sidewall 52 interrupted by a plurality of bearing reliefs 53. These reliefs are bounded by sloping sides provided for a purpose later to be described.

At its upper end, the rotor includes an array of ramp surfaces 55 which extend in a thread-like manner around the central axis 56 of the fastener, at a non-locking angle, generally more than about 14 degrees of slope.

A control ring 60, surrounds the relief element. It includes a plurality of relief ports 61, identical in number to reliefs 53, equally spaced. Between relief ports 61, the inside surface of the control ring is disposed on a cylindrical surface which forms backing surface 62. The relief ports need not extend all the way through the control ring, although depending on dimensions they might. Often they will have tapered edges for camming.

The control ring further includes attach points 63. One or more, preferably a balanced pair, of actuators 65,66 are mounted to the base. They include whatever motive means they employ, and an actuator stem 67,68 attached to respective attach points 63,64. Extension or retraction of the stems will rotate the control ring.

The motors may be of any type capable of rotating the control ring. A linear motor such as a solenoid will usually be preferred, although rotary types, or even latched spring-loaded plungers are within the scope of this invention. Preferably they will be provided as a pair to provide redundancy and balanced torque and lateral load on the ring.

Bearings 70 are placed in respective reliefs in the rotor. The bearings will preferably be roller bearings, but may be ball bearings if desired. The size of relief ports 61 is such as to capture the bearings so they will not come loose, but will permit the bearings to come loose from the rotor.

Stator 75 has an upper face 76 around the central axis, a depending skirt 77, and a downwardly facing ramp surface 78. Ramp surfaces 78 directly confront and smoothly engage ramp surfaces 55 of the rotor.

Stator skirt 77 includes a plurality of windows 79 equal in number to the recesses in the rotor and the relief ports in the control ring. The skirt fits between these two. It will be seen that when the backing surfaces confront the bearings, the bearings will be held in the windows in the stator and in the rotor recesses to bridge them. The rotor and stator are thereby locked together.

Because, as will be shown, the stator can never rotate, then while locked to it, the rotor cannot turn. When the control ring enables the bearings to leave the recesses in the rotor, they will cam out of the recesses and while still in the stator windows, enter the relief ports in the control ring. Then relative rotation of the rotor and stator can occur because the bearings then do not bridge the rotor and the stator. Thus the means to keep the fastener assembled, and to enable it to separate, is by appropriately rotating the control ring.

A key seat 90 has a bearing surface 91 abutting the top of the stator. It further includes a plurality of axial keys 92 that are fitted in axial splines 95 in the housing at its upper end. This key seat can therefore move axially, but cannot rotate. It further includes coupling keys 94 that extend downwardly and engage in recesses 95 in the top of the stator. Thus, the key seat locks the stator against rotation, but permits axial movement of the stator.

The upper face 96 of the key seat includes a tapered expansion face 97 and a bias bearing face 98. A separation bias spring 99 bears against face 98. It will preferably be a circular wave spring.

A segment locking ring 100 has a lower surface 102 facing spring 99. It includes an internal cylindrical locking surface 101. This is the ultimate locking element after the fastener has been installed.

A group of three segments 105,106, 107 is assembled around the central axis. They are all identical, except that each bears a fragment 108 of the same thread. Accordingly these may be considered to have been cut from an internally threaded cylinder, with material removed axially in three equally spaced apart locations.

Their bottom end 109 is sloped complementarily to the slope of expansion face 97. The spacings between the bottom ends are such as to be engaged by keys 110 on the key seat so the relationship between the thread fragments is maintained. Thus a thread on a bolt will smoothly engage all of the segments.

Each segment includes an outer locking wall 111 as a fragment of the same cylinder. Thus, when properly assembled, the locking surface 101 in the locking ring 100 will smoothly embrace all of the segments, and will hold them together as a group.

At the upper end of each segment there is an upper expansion face 115 which forms a fragment of a truncated cone. These are confronted by an expander 120 which is axially slidable in cylinder 41 in the housing hat.

A frusto conical expansion surface 122 is formed on the bottom of the expander 120. It presses against expansion faces 115, and tends to separate them radially. A wave spring 123 in the housing hat biases expander 120 against the segments in opposition to the bias force of separation bias spring 99. When installed, the binding together of the inserts by the locking ring will hold the segments aligned.

For a purpose and reason to be described, an access port 130 is formed in the housing hat to admit a tool (not shown) to hold the locking ring down until a bolt is threaded into the nut and tightened. Any suitable tool such as a simple rod or rods will suffice for this purpose. After the bolt is installed, the tool can be removed, because the expansive force against the locking ring will assure that the loaded and locked assembly will remain that way until the system is released.

This nut provides the advantage that all energy necessary to the separation process is already present as a mechanical, rather than as a pyrolytic source. The spring 123 will provide all of the necessary separation force. Release requires only modest energy from the motors to rotate control ring.

When being assembled, the rotor will be turned to provide the tallest assembly of stator and rotor (the relief element). The control ring will then be turned to press the bearings into the recesses in the rotor. The bearings will therefore bridge the rotor and the stator and lock them together. When ring 60 is rotated so that a window confronts the bearings, the bearings will cam out of the rotor and bridge the stator and control ring instead. Then the rotor can turn.

Returning to the installation procedure, with the stator locked, the springs, expanders, and segments are put in place, perhaps with a temporary bolt threaded in, and the relief element set to its longest dimension. Segment locking ring 100 is placed over the segments, in contact with locking walls 111, and with the separator spring compressing.

The unit is now prepared. A tool is placed to hold the locking ring down, and the temporary bolt (if used) can be withdrawn. The nut can now be stored, ready for installation.

At the time of installation, the tool remains in place until after the ultimate bolt has been installed. Then it can be removed.

The installed nut is stable and ready for its use as a fastener until the motors rotate control ring 60. The stability of the installed nut is a function of the sliding friction force between the bearing walls of the segments and locking surface 101 in locking ring 100. This in turn is a function of the applied radial (normal) lock between them. This applied radial load is principally generated by the installed bolt, whose tightened threads on the nut segments exert an outward force resisted by the rigid ring. This generated force must be sufficient to overcome the axial force exerted by bias spring 99. This is readily attained.

When the nut is to be separated, the rotor will be released to rotate and will permit the axial length of the assembled rotor and stator (the relief element) to reduce. This will gradually relieve (although quickly) the axial tensile preload in the fastener. In turn this relieves the radial forces on the segments, and locking ring 100 is freed to move upwardly. Then spring 123 biases the separator downwardly to force the segments radially apart at the top and the bottom. The bolt will now be free from the nut. It will be observed that no external energy was required for separation, except for the motors, and certainly no pyrotechnic. The separation is chemically clean and occurs with a considerably reduced mechanical shock.

This invention is not to be limited by the embodiment shown in the drawings and described in the description, which is given by way of example and not of limitation, but only in accordance with the scope of the appended claims.

I claim:

1. A separation nut to provide internal threads for an externally threaded bolt, which when tightened together develop an axial tensile load, and which requires an axial separation force for release of the bolt, said separation nut having a central axis and comprising:
   a base having an opening to pass a bolt, and a peripheral sliding surface surrounding said opening;
   a rotor having a central axial passage, a sliding surface contiguous to the sliding surface on the base, and a plurality of ramp-like surfaces surrounding said passage facing away from said sliding surface disposed at a non-locking ramp angle, a peripheral outer wall, and a plurality of recesses in said outer wall;
   a stator having a central axial passage, and a plurality of ramp-like surfaces complementary to the ramp-like surfaces on said rotor and in surface-to-surface contact with them, a skirt surrounding and in contact with the outer wall of said rotor, said skirt being pierced by a plurality of windows opening onto the outer wall of said rotor and axially aligned with said recesses, and a peripheral abutment surface on said stator surrounding its central passage facing away from its said ramp surfaces, said stator being restrained from rotation, but able to move axially;
   a control ring embracing said stator, said control ring being rotatable around said central axis, a backing surface in contact with said skirt having relief ports disposed so as to be alignable with the windows in said skirt and movable out of alignment with them, said rotor and stator together forming a relief element;
   a plurality of bearings each disposed in a respective window in said stator, and proportioned to extend between said rotor and stator to bridge them and hold the rotor against rotation in one rotational position of said control ring, and to extend into a relief port in said control ring in another rotational position of the control ring so as to bridge said stator and control ring, but to leave said rotor free to rotate relative to the stator;
   an actuator interposed between said base and said control ring adapted to rotate said control ring to align said windows and relief ports;
   a key seat having a central passage having a bearing surface bearing against said stator, keyed against rotation and having a tapered expansion face and a bias bearing face;
   a segment locking ring having a central opening defined by a cylindrical locking surface, and a bias bearing face;
   a compression spring disposed between said bias bearing race on said key seat and said bias bearing face on said segment locking ring biasing said segment locking ring axially away from said relief element;
   a plurality of axially extending nut segments each bearing a portion of the same thread, said segments being assembleable around said central axis, each segment having an arcuate outer wall which is a segment of a same cylinder which when assembled will have a circumference contiguously embraced by the cylindrical locking surface in said locking ring, each said segment having a tapered surface at each of its axial ends, and a relieved portion adjacent to said arcuate wall;
   an axially movable separator axially aligned with said segments and in contact with one of the separation surfaces of each of said segments; and
   a separation spring compressed between said housing and said separator, whereby to exert a separative radial force to remove said segments from the thread of a bolt after the rotor is permitted to rotate.

2. A separation nut according to claim 1 in which said actuator is a linear actuator.

3. A separation nut according to claim 2 in which said actuator is an electrically powered motor.

4. A separation nut according to claim 2 in which said linear actuator is a solenoid.

5. A separation nut according to claim 2 in which said actuator is a spring biased plunger.

6. A separation nut according to claim 1 in which said springs are wave springs.

7. A separation nut according to claim 1 in which an access port gives access to the inside of the housing to hold the segment locking ring against the arcuate outer walls of the segments until a bolt engaged to the segments will hold the separation nut against separation until after actuation.

\* \* \* \* \*